US007240286B2

(12) United States Patent
Yamaguchi et al.

(10) Patent No.: US 7,240,286 B2
(45) Date of Patent: Jul. 3, 2007

(54) CONTENT EDITING APPARATUS, CONTENT EDITING METHOD, CONTENT EDITING PROGRAM, AND COMPUTER-READABLE STORAGE MEDIUM

(75) Inventors: Koichiro Yamaguchi, Ashiya (JP); Kimikazu Fujita, Moriguchi (JP); Hidekazu Shimizu, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 1377 days.

(21) Appl. No.: 09/928,155

(22) Filed: Aug. 10, 2001

(65) Prior Publication Data

US 2002/0054071 A1    May 9, 2002

(30) Foreign Application Priority Data

Aug. 25, 2000  (JP)  ............. 2000-255067

(51) Int. Cl.
*G06F 3/00* (2006.01)
*H04N 5/445* (2006.01)

(52) U.S. Cl. ............. 715/723; 715/726; 715/744; 725/37; 725/47

(58) Field of Classification Search ......... 715/723, 715/726, 733, 744, 716
See application file for complete search history.

(56) References Cited

U.S. PATENT DOCUMENTS

| | | | | |
|---|---|---|---|---|
| 5,760,767 A | * | 6/1998 | Shore et al. | 715/723 |
| 5,999,173 A | * | 12/1999 | Ubillos | 715/724 |
| 6,026,389 A | * | 2/2000 | Nakajima et al. | 707/1 |
| 6,031,529 A | * | 2/2000 | Migos et al. | 715/783 |
| 6,072,503 A | * | 6/2000 | Tani et al. | 345/473 |
| 6,204,840 B1 | * | 3/2001 | Petelycky et al. | 715/500.1 |
| 6,222,530 B1 | * | 4/2001 | Sequeira | 715/500.1 |
| 6,332,147 B1 | * | 12/2001 | Moran et al. | 715/500.1 |
| 6,353,444 B1 | * | 3/2002 | Katta et al. | 715/716 |
| 6,414,686 B1 | * | 7/2002 | Protheroe et al. | 345/474 |
| 6,618,058 B1 | * | 9/2003 | Yasui | 715/723 |
| 6,757,911 B1 | * | 6/2004 | Shimoji et al. | 725/136 |
| 2001/0013130 A1 | * | 8/2001 | Shimizu et al. | 725/91 |
| 2002/0157093 A1 | * | 10/2002 | Akiyama et al. | 725/32 |

(Continued)

FOREIGN PATENT DOCUMENTS

| EP | 0 827 336 | 8/1997 |
|---|---|---|
| WO | WO 00/11561 | 3/2000 |

OTHER PUBLICATIONS

"Digital Video Broadcasting (DVB); DVB specification for data broadcasting EN 301 192", ETSI Standards, European Telecommunications Standards Institute, Sophia-Antipo, France, vol. BC, No. V121, Jun. 1999.

*Primary Examiner*—Sy D. Luu

(57) ABSTRACT

A content editing apparatus that edits digital broadcast content that is composed of a plurality of data carousels for realizing pseudo-interaction is provided. An operation reception unit receives identification information and a transmission start time and a transmission end time of each module that constitutes a data carousel from an operator. A control unit stores the received information as module information into a module information storage unit. A data carousel definition unit sorts each transmission start time and transmission end time included in the module information, defines a carousel time period of each data carousel based on the sorted times, and selects modules to be transmitted during each carousel time period.

16 Claims, 15 Drawing Sheets

U.S. PATENT DOCUMENTS

2002/0170056 A1* 11/2002 Akiyama et al. ............. 725/35
2003/0135464 A1* 7/2003 Mourad et al. ............... 705/50
2003/0221197 A1* 11/2003 Fries et al. .................. 725/117
2004/0148637 A1* 7/2004 Sterkin et al. ............. 725/115

* cited by examiner

FIG. 7

701 MODULE INFORMATION

| MODULE NAME | MODULE ID | MODULE VERSION | TRANSMISSION START TIME (HOUR:MINUTE:SECOND) | TRANSMISSION END TIME (HOUR:MINUTE:SECOND) |
|---|---|---|---|---|
| Module_0 | 0000 | 00 | 00 : 00 : 00 | 00 : 05 : 00 |
| Module_0 | 0000 | 01 | 00 : 05 : 00 | 00 : 10 : 00 |
| Module_1 | 0001 | 00 | 00 : 00 : 00 | 00 : 08 : 00 |

801 CAROUSEL TRANSMISSION INFORMATION

| CAROUSEL NAME | DATA (MODULE) | TRANSMISSION START TIME (HOUR:MINUTE:SECOND) | TRANSMISSION END TIME (HOUR:MINUTE:SECOND) |
|---|---|---|---|
| 1 | MODULE(0000, 00) MODULE(0001, 00) | 00 : 00 : 00 | 00 : 05 : 00 |
| 2 | MODULE(0000, 01) MODULE(0001, 00) | 00 : 05 : 00 | 00 : 08 : 00 |
| 3 | MODULE(0000, 01) | 00 : 08 : 00 | 00 : 10 : 00 |

901 CONTENT EDITING SCREEN

Shopping

An example of carousel/module timeline editor

| CarouselName | Carousel_1 | Carousel_2 | Carousel_3 |
| --- | --- | --- | --- |
| | 902 | 903 | 904 |
| module Name : ID_Version | 00:00:00 | 00:05:00 | 00:10:00 |
| Module_0 : 0000_00 | | | |
| Module_0 : 0000_01 | | | |
| Module_1 : 0001_00 | | | |

| CAROUSEL NAME | CAROUSEL TOTAL DATA SIZE (BIT) | DATA TRANSMISSION BIT RATE (BIT/SECOND) | STANDARD RESPONSE TIME (SECOND) | TRANSMISSION START TIME (HOUR:MINUTE:SECOND) | TRANSMISSION END TIME (HOUR:MINUTE:SECOND) |
|---|---|---|---|---|---|
| 1 | 150 | 1000 | 0.15 | 00 : 00 : 00 | 00 : 05 : 00 |
| 2 | 100 | 1000 | 0.1 | 00 : 05 : 00 | 00 : 08 : 00 |
| 3 | 50 | 100 | 0.5 | 00 : 08 : 00 | 00 : 10 : 00 |

1101 CAROUSEL INFORMATION

CONTENT EDITING APPARATUS, CONTENT EDITING METHOD, CONTENT EDITING PROGRAM, AND COMPUTER-READABLE STORAGE MEDIUM

BACKGROUND OF THE INVENTION (1) Field of the Invention

The present invention relates to a content editing apparatus and a content editing method for editing digital broadcast content that is made up of a plurality of data carousels.

(2) Description of Related Art

In recent years, digitalization of broadcast has made not only conventional video and audio delivery but also mass data delivery possible. In digital broadcast, data broadcast involving the mass data delivery has widely been put into practice. Broadcast typically means one-way delivery of video information from broadcast stations without any interaction with receiving terminals. However, Japanese Laid-open Patent Application No. 10-313449 discloses a technique for realizing pseudo-interaction between broadcasters and receivers. According to the technique, video information is repeatedly broadcasted, so that users of reception terminals can manipulate the received video information interactively (such repeated transmission is hereafter referred to as "data carousel").

Conventionally, content producers have been required to define such data carousels. To define the data carousels, the content producers are required not only to understand data to make up the data carousels that constitute broadcast content, but also to be well acquainted with the concept of "data carousel" that is a data transmission method. This gives the content producers substantial burdens.

SUMMARY OF THE INVENTION

In view of the above problem, the present invention has its principal object the provision of a content editing apparatus and a content editing method that enable the content producers (hereafter referred to as "operators") to edit broadcast content easily even without knowledge about the data carousel.

The above object can be achieved by a content editing apparatus that edits digital broadcast content that is composed of a plurality of data carousels for realizing pseudo-interaction, the content editing apparatus including: a reception unit for receiving, from an operator, transmission start times and transmission end times of modules forming each data carousel; and a data carousel definition unit for (a) sorting the received transmission start times and the transmission end times into a time order, (b) defining a carousel time period of each of the plurality of data carousels separated by the sorted transmission start times and the transmission end times, and (c) selecting modules to be transmitted during the carousel time period.

With this construction, a carousel time period during which each module for content is to be transmitted can be defined easily.

Also, the reception unit may include: a time axis display unit for displaying a time axis with time divisions; a module specification unit for specifying a module, using identification information that is composed of a module ID and a version; and a transmission time specification unit for receiving, from the operator, specification of locations on a display displayed by the time axis display unit, so as to specify a transmission start time and a transmission end time of the specified module, the locations each corresponding to a time division on the time axis.

With this construction, the operator can easily input a transmission start time and a transmission end time of each module.

Also, the reception unit may further include a bar graph display unit for displaying a bar graph that is parallel to the time axis, and the transmission time specification unit receives an operation of the operator to specify the transmission start time and the transmission end time, the operation being (a) drag-and-drop of a start of the bar graph to the location corresponding to the transmission start time and (b) drag-and drop of an end of the bar graph to the location corresponding to the transmission end time, the start of the bar graph and the end of the bar graph at an initial state respectively corresponding to a broadcast start time and a broadcast end time of the digital broadcast content.

With this construction the operator can easily specify a transmission time period of each module, by utilizing GUI.

Also, the content editing apparatus may further include a module information storage unit for storing a list of the transmission start times and the transmission end times of the modules received by the reception unit, wherein the data carousel definition unit includes: a time sort unit for sorting the transmission start times and the transmission end times into the time order; a carousel definition unit for defining the carousel time period of each of the plurality of data carousel separated by the sorted transmission start times and the transmission end times; a module selection unit for selecting modules to be transmitted during the carousel time period; and a carousel transmission information storage unit for storing identification information of each module to be transmitted during the carousel time period.

With this construction, modules selected for each carousel time period can be identified correctly.

Also, the data carousel definition unit may further include a carousel time period display unit for displaying each carousel time period stored by the carousel transmission information storage unit, so as to be in correspondence with the time divisions on the time axis displayed by the time axis display unit.

With this construction, the operator can see each carousel time period by utilizing GUI.

Also, the content editing apparatus may further include: a module storage unit for storing modules, identification information for identifying each module, and items of each module, and a content structure display control unit for displaying a structure of the digital broadcast content in a form that can be viewed by the operator, the structure being a hierarchy including a broadcast content, data carousels, identification information for modules forming each data carousel, identification information for items of each module, in a stated order.

With this construction, the operator can see data items of each module of each data carousel constituting broadcast content in a hierarchy. Therefore, the operator can be notified of the structure of the broadcast content at sight.

Also, the content editing apparatus may further include: a transmission bit rate reception unit for receiving specification of a transmission bit rate for each data carousel from the operator; a module storage unit for storing a size of each module; and a standard response time calculation unit for summing up sizes of the modules selected by the data carousel definition unit to be transmitted during the carousel time period, and dividing a resulting value by the transmission bit rate for the data carousel, to obtain a standard response time for the data carousel, the standard response time being a transmission time period of one cycle of the data carousel when each module included therein is transmitted at once sequentially.

With this construction, one cycle of each data carousel is calculated. Therefore, the operator can be notified of a standard response time of a reception apparatus receiving digital broadcast content for each data carousel.

Also, the content editing apparatus may further include a standard response time display unit for displaying the standard response time for each data carousel calculated by the standard response time calculation unit.

With this construction, the operator can judge whether a standard response time is appropriate or not, by utilizing GUI.

Also, the content editing apparatus may further include: a transmission bit rate change unit for receiving, from the operator, specification of a transmission bit rate for a data carousel, when the standard response time of the data carousel displayed by the response time display unit needs to be changed; a standard response time re-calculation unit for re-calculating the standard response time of the data carousel; and a standard response time change display unit for displaying the standard response time re-calculated by the standard response time re-calculation unit instead of the standard response time previously displayed.

With this construction, the operator can change a data transmission bit rate to an appropriate bit rate.

Also, the content editing apparatus may further include: a standard response time change operation unit for receiving, from the operator, input of a standard response time of the data carousel, when the standard response time of the data carousel displayed by the response time display unit needs to be changed; a data transmission bit rate calculation unit for dividing a total size of the data carousel by the input standard response time to obtain the transmission bit rate; and a data transmission bit rate display unit for displaying the calculated transmission bit rate.

With this construction, a data transmission bit rate to be set using an appropriate standard response time can be obtained.

The object of the present invention can also be achieved by a content editing method for editing digital broadcast content that is composed of a plurality of data carousels for realizing pseudo-interaction, the content editing method including: a reception step for receiving, from an operator, transmission start times and transmission end times of modules forming each data carousel; and a data carousel definition step for (a) sorting the received transmission start times and the transmission end times into a time order, (b) defining a carousel time period of each of the plurality of data carousels separated by the sorted transmission start times and the transmission end times, and (c) selecting modules to be transmitted during the carousel time period.

With this construction, a carousel time period during which each module for content is to be transmitted can be defined easily.

The object of the present invention can also be achieved by a program for making a computer execute a content editing method for editing digital broadcast content that is composed of a plurality of data carousels for realizing pseudo-interaction, the content editing method including: a reception step for receiving, from an operator, transmission start times and transmission end times of modules forming each data carousel; and a data carousel definition step for (a) sorting the received transmission start times and the transmission end times into a time order, (b) defining a carousel time period of each of the plurality of data carousels separated by the sorted transmission start times and the transmission end times, and (c) selecting modules to be transmitted during the carousel time period.

With this construction, by making a computer execute a program relating to the present invention, a carousel time period during which each module for content is to be transmitted can be defined easily.

The object of the present invention can further be achieved by a computer-readable storage medium that can be applied to a content editing apparatus that edits digital broadcast content that is made up of a plurality of data carousels for realizing pseudo-interaction, the computer-readable storage medium storing a program including: a reception step for receiving, from an operator, transmission start times and transmission end times of modules forming each data carousel; and a data carousel definition step for (a) sorting the received transmission start times and the transmission end times into a time order, (b) defining a carousel time period of each of the plurality of data carousels separated by the sorted transmission start times and the transmission end times, and (c) selecting modules to be transmitted during the carousel time period.

With this construction, by applying a computer-readable storage medium relating to the present invention to a content editing apparatus that does not have the function of defining a carousel time period during which each module for content is to be transmitted, the carousel time period during which each module for content is to be transmitted can be defined easily.

Also, a content editing apparatus that edits content stored at a site on a network in a state of being available for a validity period, including: a reception unit for receiving, from an operator, transmission start times and transmission end times of modules forming content; and a module definition unit for (a) sorting the transmission start times and the transmission end times of the modules into a time order, (b) defining validity periods separated by the sorted transmission start times and the transmission end times, and (c) selecting modules to be made available for each defined validity period.

With this construction, a content editing apparatus that is capable of defining modules stored at a site on a network to be available for each validity period can be realized.

BRIEF DESCRIPTION OF THE DRAWINGS

These and other objects, advantages and features of the invention will become apparent from the following description thereof taken in conjunction with the accompanying drawings that illustrate a specific embodiment of the invention. In the drawings:

FIG. 7 shows an example of module information stored in a module information storage unit in the above embodiment;

FIG. 8 shows an example of carousel transmission information defined by a data carousel definition unit in the above embodiment;

FIG. 9 shows the carousel transmission information displayed by the display unit in the above embodiment;

FIG. 11 shows an example of carousel information including a standard response time calculated by a response time calculation unit in the above embodiment;

DESCRIPTION OF THE PREFERRED EMBODIMENT

An explanation is first given on the concept of "data carousel" to realize interactivity in broadcast, prior to description of a content editing apparatus relating to a preferred embodiment of the present invention.

The term "carousel" literally means "merry-go-round", and the term "data carousel" referred to herein intends to mean a group of sets of data that are necessary in a specified time period. Each set of such data is hereafter referred to as a "module".

Modules of a data carousel are repeatedly transmitted as broadcasts during a specified time period. When requesting a certain module of the data carousel, a reception apparatus waits for the request module to be transmitted. The reception apparatus obtains the request module when it is transmitted, and performs processing on the module such as display. Each module corresponds to a going round carousel pony on a merry-go-round. The state of carousel ponies going round on the merry-go-round is compared to the state of a group of modules repeatedly being transmitted, from which the reception apparatus obtains a certain module. This is the origin of the term "data carousel".

Since the data carousel is a group of modules each of which is separated by time, partial modification, addition, or deletion of these modules results in a new data carousel being transmitted at a following moment.

To realize interactivity in the broadcast, data carousels that each are a group of modules to be transmitted during a specified time period need to be defined as described above. Without the content editing apparatus relating to the present invention, content producers are required to define such data carousels with reference to transmission time periods of modules.

Preferred Embodiment

Figure 1:
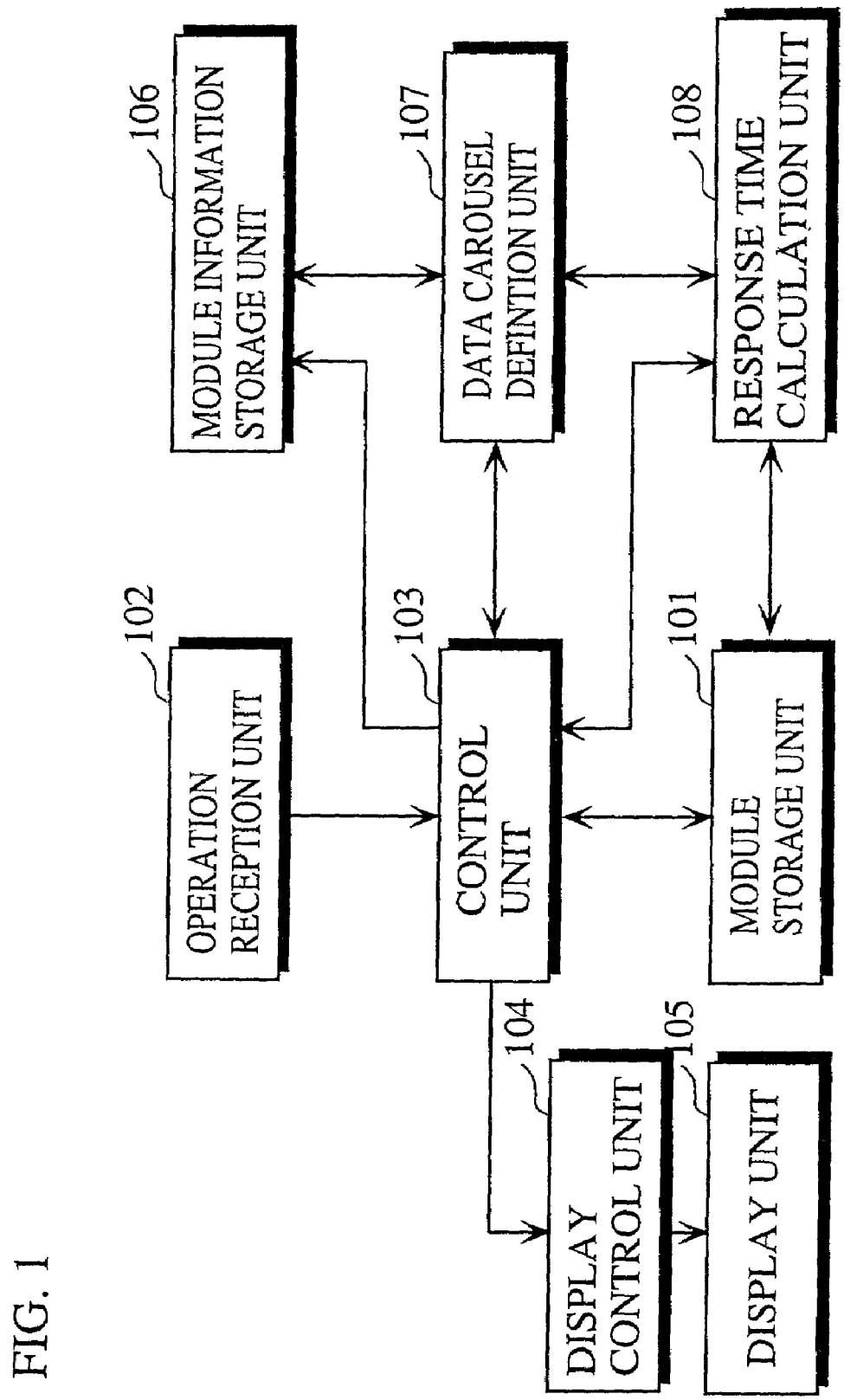
FIG. 1 shows a construction of a content editing apparatus that is a preferred embodiment of the present invention.

FIG. 1 shows a construction of the content editing apparatus relating to a preferred embodiment of the present invention.

The content editing apparatus is roughly composed of a module storage unit 101, an operation reception unit 102, a control unit 103, a display control unit 104, a display unit 105, a module information storage unit 106, a data carousel definition unit 107, and a response time calculation unit 108.

The module storage unit 101 stores a plurality of modules that constitute data carousels.

Figure 2:
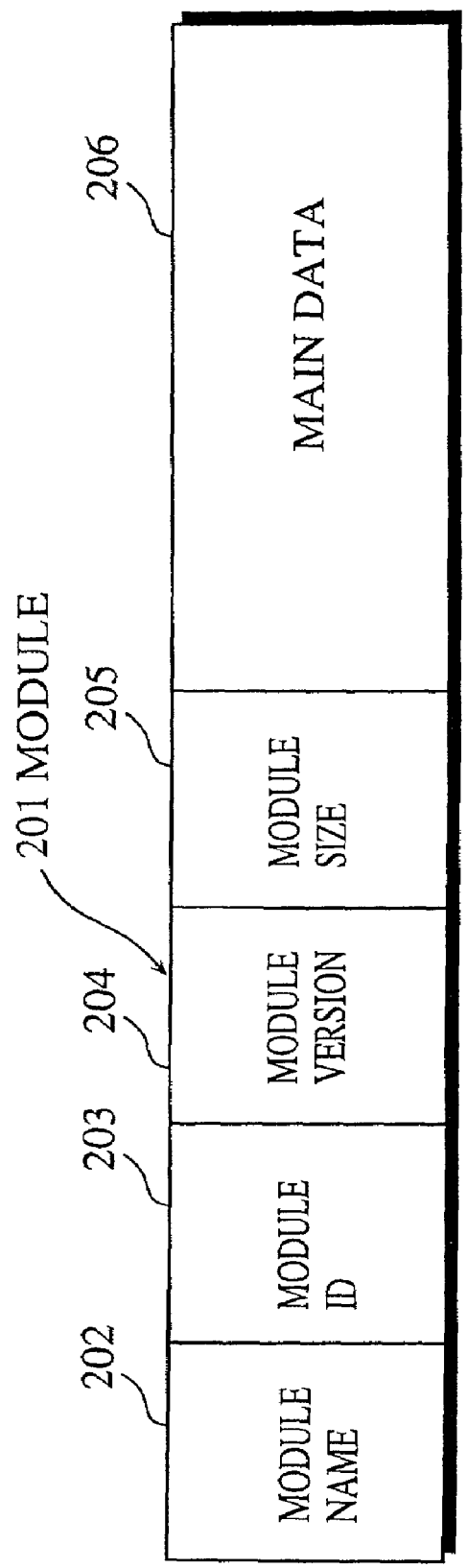
FIG. 2 shows an example of a data structure of a module stored in a module storage unit in the above embodiment.

FIG. 2 shows an example of a data structure of a module. A module 201 includes a module name 202, a module ID 203, a module version 204, a module size 205, and a main data 206. The module 201 is given the module name 202 that implies information of the main data 206. The module 201 can be identified by the module ID 203 and the module version 204. The module size 205 indicates a size of the module 201 expressed in bit units. The main data 206 is data that is processed and, for example, displayed on a display screen when the module 201 is received as being included in a data carousel by the reception apparatus.

It should be noted that detailed information of the main data 206 such as data items are recorded as descriptors (not illustrated).

The operation reception unit 102 is constructed by a mouse, a keyboard, and the like. The operation reception unit 102 receives, from an operator, input or a mouse operation indicating a module name, a module ID, a module version, a transmission bit rate of a data carousel, and the like, and notifies the control unit 103 of the received information.

The control unit 103 is notified of a content name and a content broadcast time period by the operation reception unit 102, and instructs the display control unit 104 to display an initial screen for content editing. The initial screen displays a time axis with time divisions corresponding to the content broadcast time period, for inputting a transmission start time and a transmission end time of a module.

The control unit 103 is also notified of a module name, a module ID, and a module version by the operation reception unit 102. The control unit 103 then records the received information into the module information storage unit 106, and instructs the display control unit 104 to control the display unit 105 so as to display the received information and a bar graph whose length corresponds to the content broadcast time period.

When drag-and-drop of the start of the bar graph is performed via the operation reception unit 102, the control unit 103 sets the time corresponding to the location to which the start of the bar graph has been dragged and dropped as the transmission start time, and stores the set transmission start time in the module information storage unit 106. When drag-and-drop of the end of the bar graph is performed via the operation reception unit 102, the control unit 103 sets the time corresponding to the location to which the end of the bar graph has been dragged and dropped as the transmission end time, and stores the set transmission end time in the module information storage unit 106.

When setting a transmission start time and a transmission end time of each module stored in the module storage unit 101 is completed via the operation reception unit 102, the control unit 103 instructs the data carousel definition unit 107 to define data carousels.

The control unit 103 is notified of the data carousels and their carousel time periods defined by the data carousel definition unit 107, and instructs the display control unit 104 to control the display unit 105 so as to display the carousel time periods in correspondence with time divisions on the time axis displayed on the content editing screen.

Also, the control unit 103 reads carousel transmission information stored in the data carousel definition unit 107, reads data items of each module to be transmitted in each carousel time period, and notifies the display control unit 104 of the read data items. The control unit 103 then instructs the display control unit 104 to display the content structure.

The control unit 103 is notified of a data transmission bit rate for each carousel time period by the operation reception unit 102, and then notifies the response time calculation unit 108 of each received data transmission bit rate.

The control unit 103 is notified of a standard response time of each carousel time period by the response time calculation unit 108. The control unit 103 then notifies the display control unit 104 of each standard response time, and instructs the display control unit 104 to control the display unit 105 so as to display each standard response time.

The following describes input of module information, taking a specific display screen displayed by the display unit 105 as example.

Figure 3:
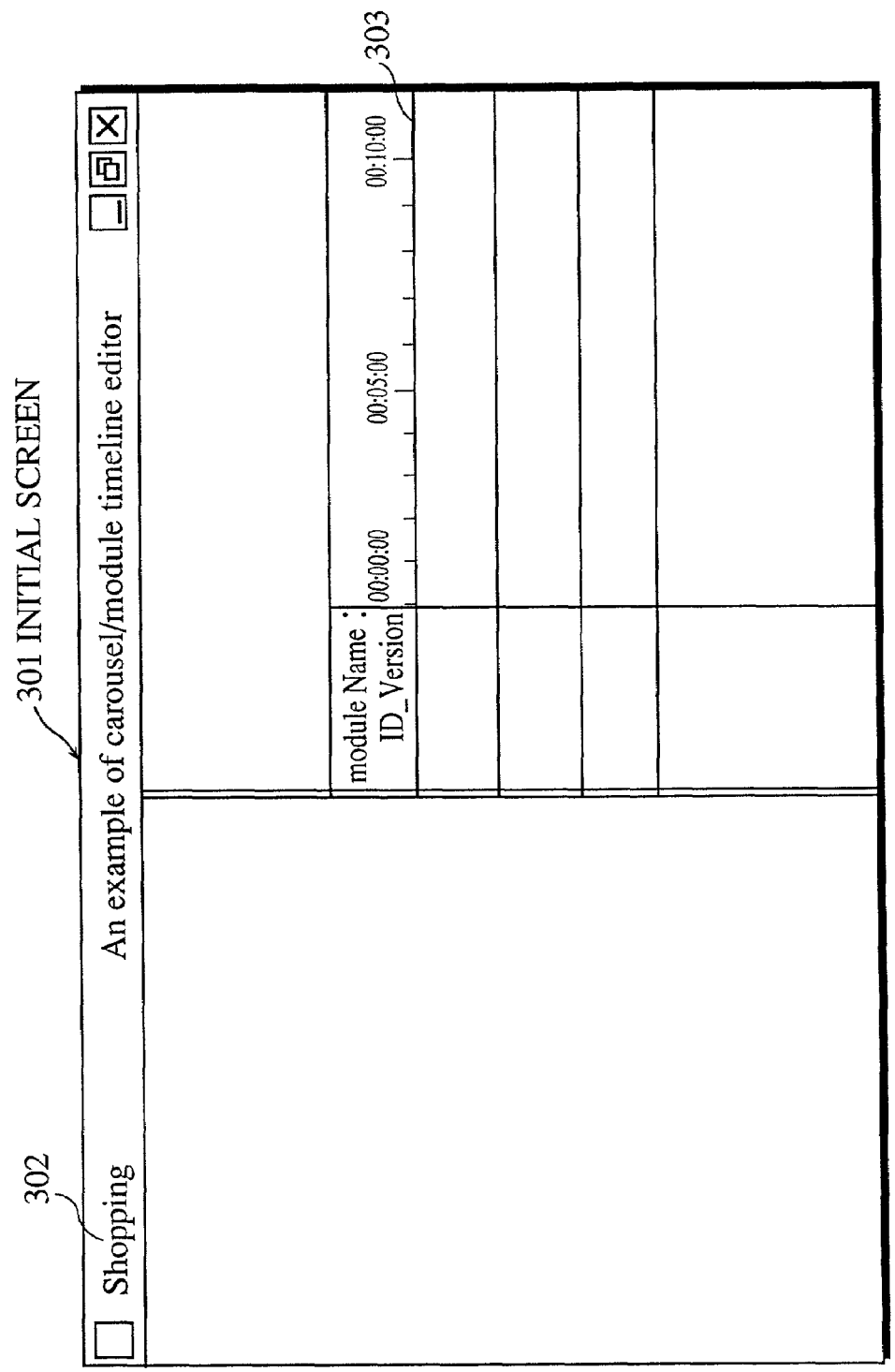
FIG. 3 shows an example of an initial screen displayed by a display unit for inputting a transmission start time and a transmission end time of each module in the above embodiment.

The display control unit 104 is instructed to display the initial screen for content editing by the control unit 103, and controls the display unit 105 to display the initial screen as shown in FIG. 3.

The initial screen 301 displays a content name 302 of a broadcast content, and a time axis 303 with time divisions corresponding to the content broadcast time period.

The display control unit 104 is notified of the module name and other information by the control unit 103, and controls the display unit 105 to display a content editing screen 403 on which module identification information 401 and a bar graph 402 are displayed. The module identification information 401 is composed of a module name, a module ID, and a module version, and the bar graph 402 is for specifying a transmission time period of the module (FIG. 4).

The start 404 of the bar graph 402 is at a location corresponding to the time "00:00:00" on the time axis 303 that indicates the start time of the broadcast content. The end 405 of the bar graph 402 is at a location corresponding to the time "00:10:00" that indicates the end time of the broadcast content.

On the content editing screen 403, the operator points a cursor 406 at the start 404 or the end 405 of the bar graph 402, and drags and drops the cursor 406 to respectively specify the transmission start time or the transmission end time of the module.

Figure 4:
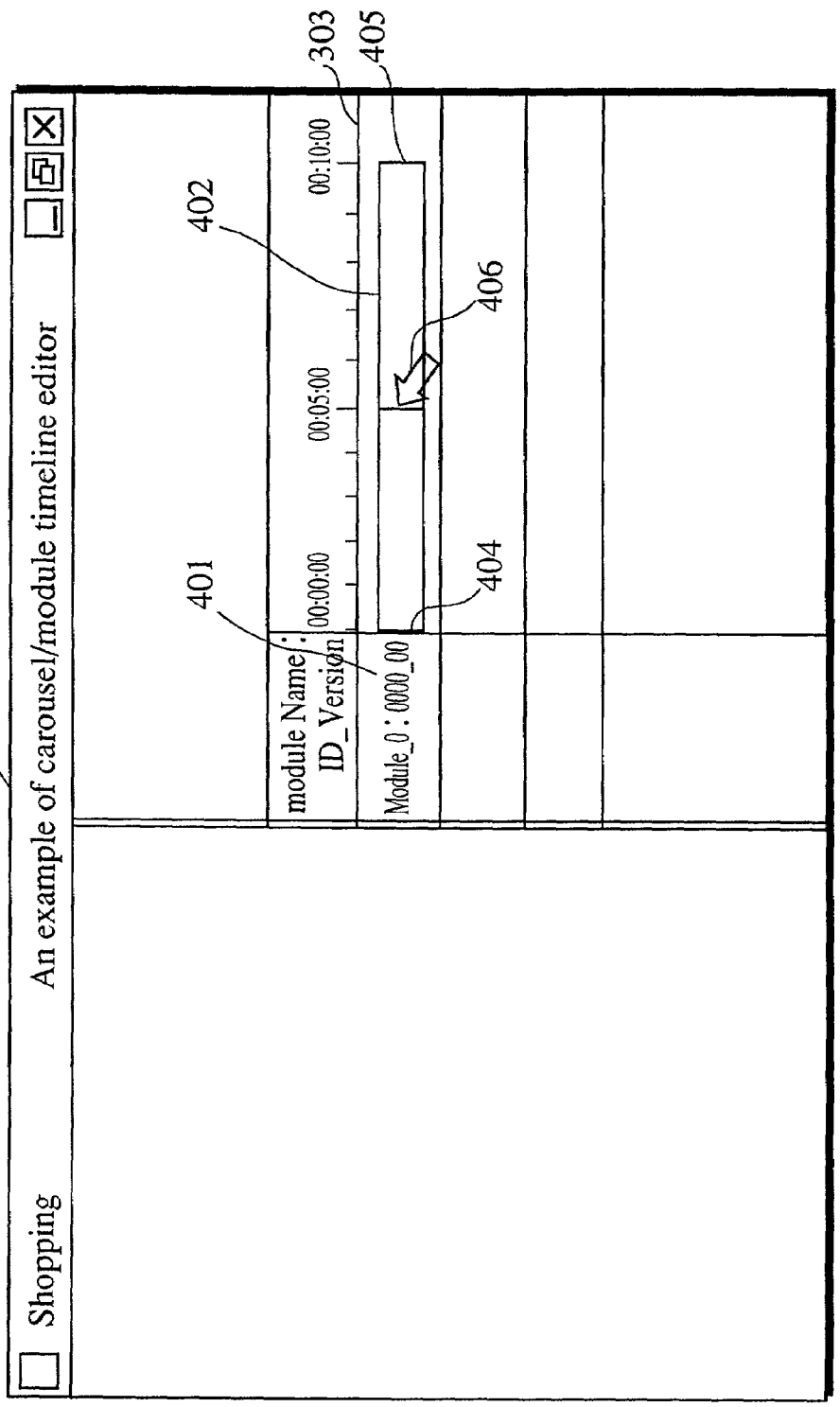
FIG. 4 shows a state where a transmission start time and a transmission end time of a module are specified using a bar graph displayed by the display unit in the above embodiment.
Figure 5:
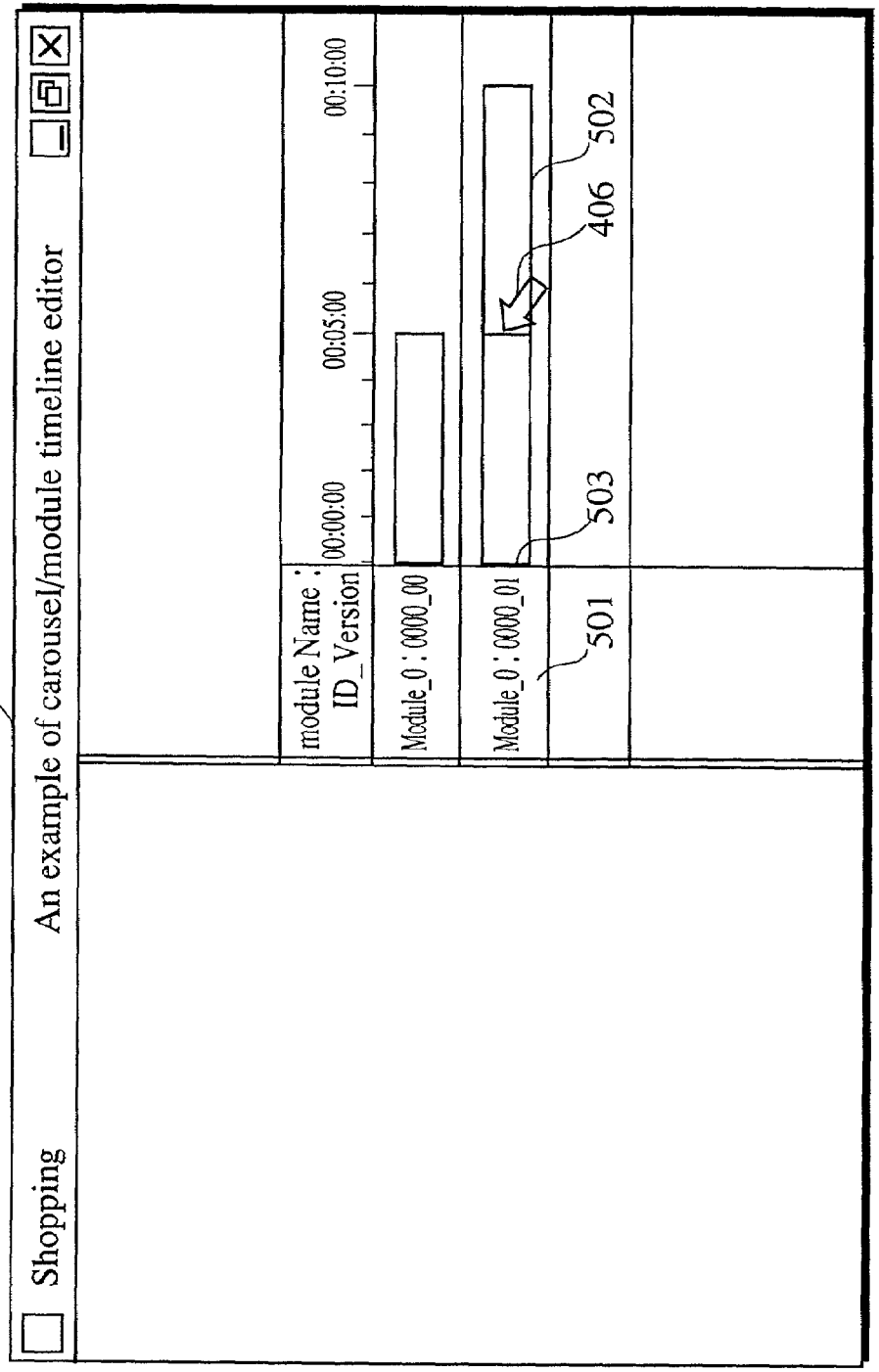
FIG. 5 shows a state where a transmission start time and a transmission end time of another module are specified in the same manner as in FIG. 4.

FIG. 4 shows a state where the cursor 406 has been pointed at the end 405 and then has been dragged and dropped to the location corresponding to the time "00:05:00".

In this way, the transmission start time and the transmission end time of the module "Module_0:0000_00" 401 has been respectively set at the time "00:00:00" and the time "00:05:00".

The display control unit 104 is notified of the mouse operation of the operator performed via the operation reception unit 102, by the control unit 103, and controls the display unit 105 to display the cursor. Following this, the display control unit 104 controls the display unit 105 to display the bar graph 402 corresponding to the time period between the transmission start time and the transmission end time of the module 401.

In the same way, the display unit 104 controls the display unit 105 to display the transmission start time and the transmission end time of the module "Module_0:0000_01" 501 in the form of a bar graph 502. For the module 501, the start 503 of the bar graph 502 has been dragged and dropped by the cursor 406 to the time "00:05:00", meaning that the transmission start time is set at "00:05:00".

Figure 6:
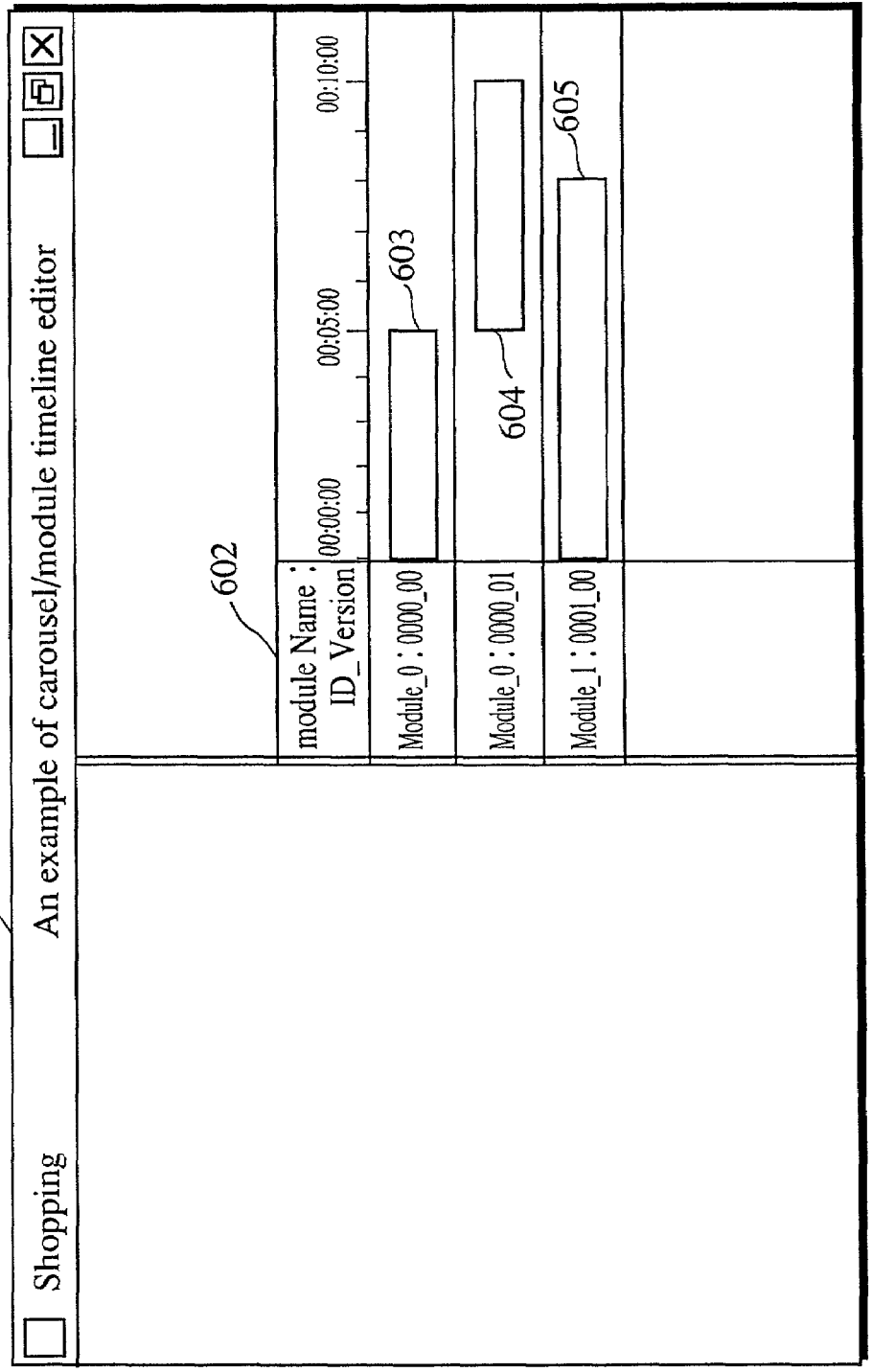
FIG. 6 shows a state where specifying the transmission start time and the transmission end time of each module has been completed.

FIG. 6 shows a state immediately after setting the transmission start time and the transmission end time of each module has been completed on the content editing screen. On the content editing screen 601 displayed by the display unit 105, three modules make up the content as can be known from the module identification information 602. The transmission time periods of the three modules are respectively shown by bar graphs 603, 604, and 605.

The module identification information 602 and the transmission time period (the start time and the end time) of each module are recorded in the module information storage unit 106 by the control unit 103.

The display unit 105 is constructed by a CRT, an LCD, or the like, and displays GUI content editing screens such as the content editing screens 301, 403, 504, and 601 described above.

The module information storage unit 106 is constructed by a RAM or the like, and stores module information inputted by the operator via the operation reception unit 102.

FIG. 7 shows an example of module information stored in the module information storage unit 106.

The module information 701 includes a transmission time period of each module stored in the module storage unit 101. Specifically, the module information 701 includes a module name 702, a module ID 703, a module version 704, which are module identification information, and a transmission start time 705, and a transmission end time 706. The module information 701 is recorded by the control unit 103.

The data carousel definition unit 107 defines carousel time periods according to an instruction given by the control unit 103. The data carousel definition unit 107 then selects modules to be transmitted during each defined carousel time period, generates carousel transmission information accordingly, and records the generated carousel transmission information.

The data carousel definition unit 107 reads transmission start times 705 and transmission end times 706 of modules, included in the module information 701 stored in the module information storage unit 106, and sorts the read transmission start times 705 and the transmission end times 706 into the time order, regardless of the distinction of the start time and the end time. Here, if sorted times match each other, these times are considered as one. Of the sorted times, every pair of two times in the time order is considered as a pair of the transmission start time and the transmission end time of a data carousel. Accordingly, the data carousel definition unit 107 defines a carousel transmission time period of each data carousel, and includes each defined carousel transmission time period into the carousel transmission information.

Following this, the data carousel definition unit 107 reads the transmission start time 705 and the transmission end time 706 of each module, included in the module information 701, selects modules to be transmitted during each carousel transmission time period included in the carousel transmission information, and includes the selected modules into the carousel transmission information.

FIG. 8 shows an example of the carousel transmission information generated by the data carousel definition unit 107. The carousel transmission information 801 includes a carousel name 802, data 803, a transmission start time 804 and a transmission end time 805 of the data 803.

The carousel name 802 identifies a data carousel using a number given in the transmission order of the data carousel.

The data 803 is data that constitutes a data carousel, that is to say, the data 803 is a group of modules, each of which is identified by a module ID and a module version.

The transmission start time 804 is a transmission start time of a data carousel, and is expressed by hour, minute, and second.

The transmission end time 805 is a transmission end time of a data carousel, and is expressed by hour, minute, and second.

The data carousel definition unit 107 generates the carousel transmission information 801, and notifies the control unit 103 of the carousel transmission information 801.

The following describes a content editing screen after the carousel transmission information 801 is generated by the data carousel definition unit 107.

The display control unit 104 is notified of carousel names and transmission start times and transmission end times of the data carousels by the control unit 103, and controls the display unit 105 so as to display the content editing screen as shown in FIG. 9.

On the content editing screen 901, carousel time periods for data carousels 902, 903, and 904 separated by locations corresponding to the time graduations on the time axis 303, and their carousel names are displayed on the upper right. This indicates that the data carousel "Carousel_1" is transmitted during the time period from "00:00:00" to "00:05:00", and the data carousel "Carousel_2" is transmitted during the time period from "00:05:00" to "00:08:00", and the data carousel "Carousel_3" is transmitted during the time period from "00:08:00" to "00:10:00".

Figure 10:
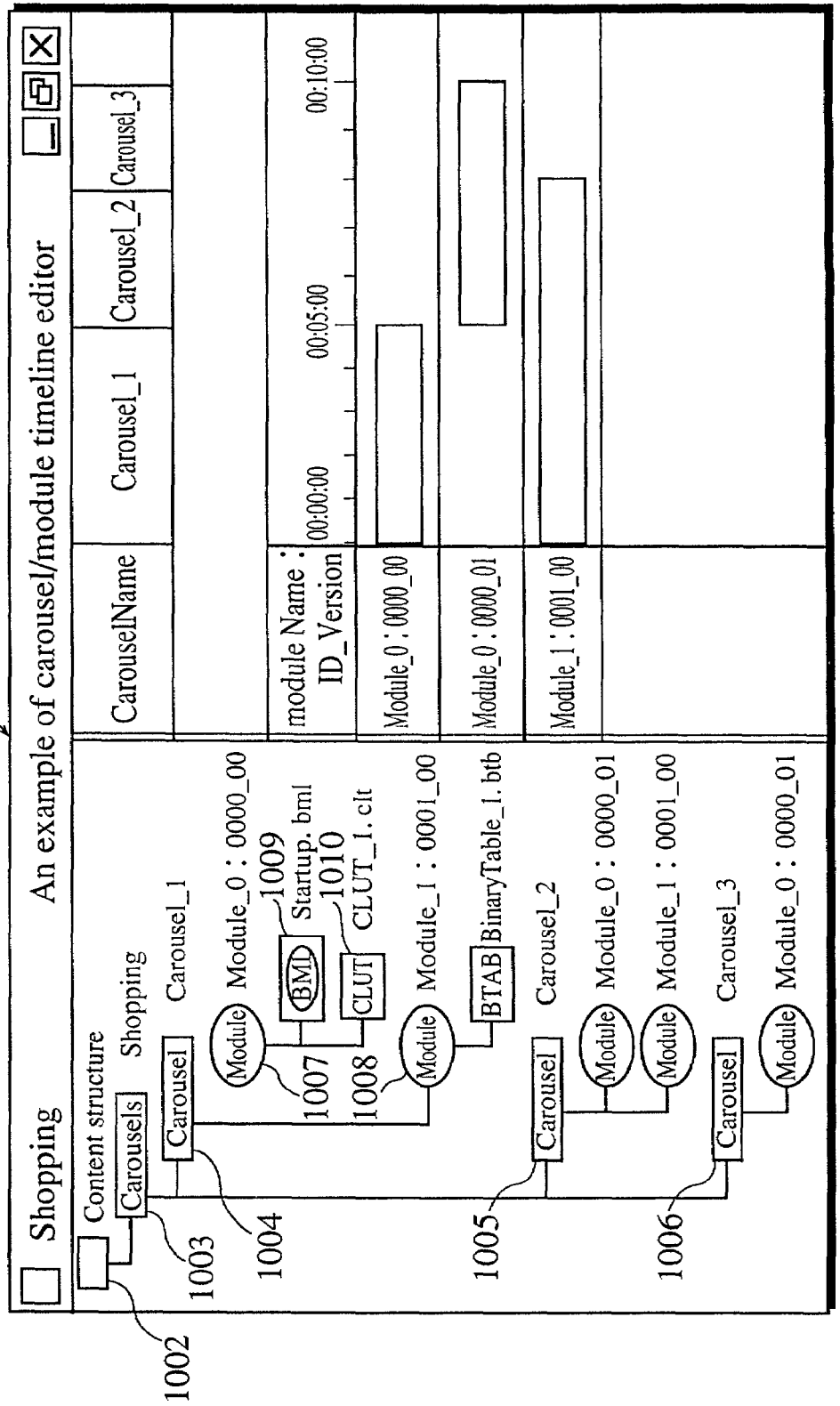
FIG. 10 shows an edited content structure displayed by the display unit in the above embodiment.

The display control unit 104 is notified of each carousel name, identification information of modules constituting each data carousel, and data items of each module by the control unit 103, and controls the display unit 105 so as to display the content editing screen as shown in FIG. 10.

On the content editing screen 1001, a content structure 1002 is displayed on the left. The content structure 1002 schematically shows carousel names 802, data 803 in the carousel transmission information 801 and data items of each module stored in the module storage unit 101.

The content structure 1002 shows a hierarchical structure of content that is made up of carousels 1003. In the hierarchy, the carousels 1003 include three data carousels "Carousel_1" 1004, "Carousel_2" 1005, and "Carousel_3" 1006 as can be seen in the figure. Also, in the figure, the data carousel "Carousel_1" 1004 includes two modules "Module_0:0000_00" 1007 and "Module_1:0001_00" 1008. Furthermore, the module "Module_0:0000_00" 1007 includes data items "BML" 1009 and "CLUT" 1010.

As described above, data in each carousel time period defined by the data carousel definition unit 107 can be schematically displayed as the content structure 1002. Due to this, the operator is notified of modules to be transmitted during each carousel time period at sight.

The response time calculation unit 108 is notified, by the control unit 103, of a data transmission bit rate of each data carousel inputted by the operator via the operation reception unit 102, and reads module IDs and module versions of modules in each data carousel, included in the carousel transmission information 801, and reads a size of each module stored in the module storage unit 101. The response time calculation unit 108 then calculates a total size of each data carousel in bit units. The response time calculation unit then divides the calculated total size of each data carousel by its data transmission bit rate (bit/second) inputted by the operator, to obtain the standard response time for each data carousel. The response time calculation unit 108 records each resulting standard response time as the carousel information, and notifies the control unit 103 of each standard response time.

FIG. 11 shows an example of the carousel information including the calculated standard response times. Carousel information 1101 includes a carousel name 1102, a carousel total size 1103, a data transmission bit rate 1104, a standard response time 1105, a transmission start time 1106, and a transmission end time 1107. The standard response time is a time taken to receive a desired module by the reception apparatus receiving a data carousel, and is a time taken for one cycle of a data carousel on which modules included in the data carousel are sequentially transmitted.

The display control unit 104 is notified, by the control unit 103, of the standard response times calculated by the response time calculation unit 108, and controls the display unit 105 to display the standard response times on the content editing screen.

Figure 12:
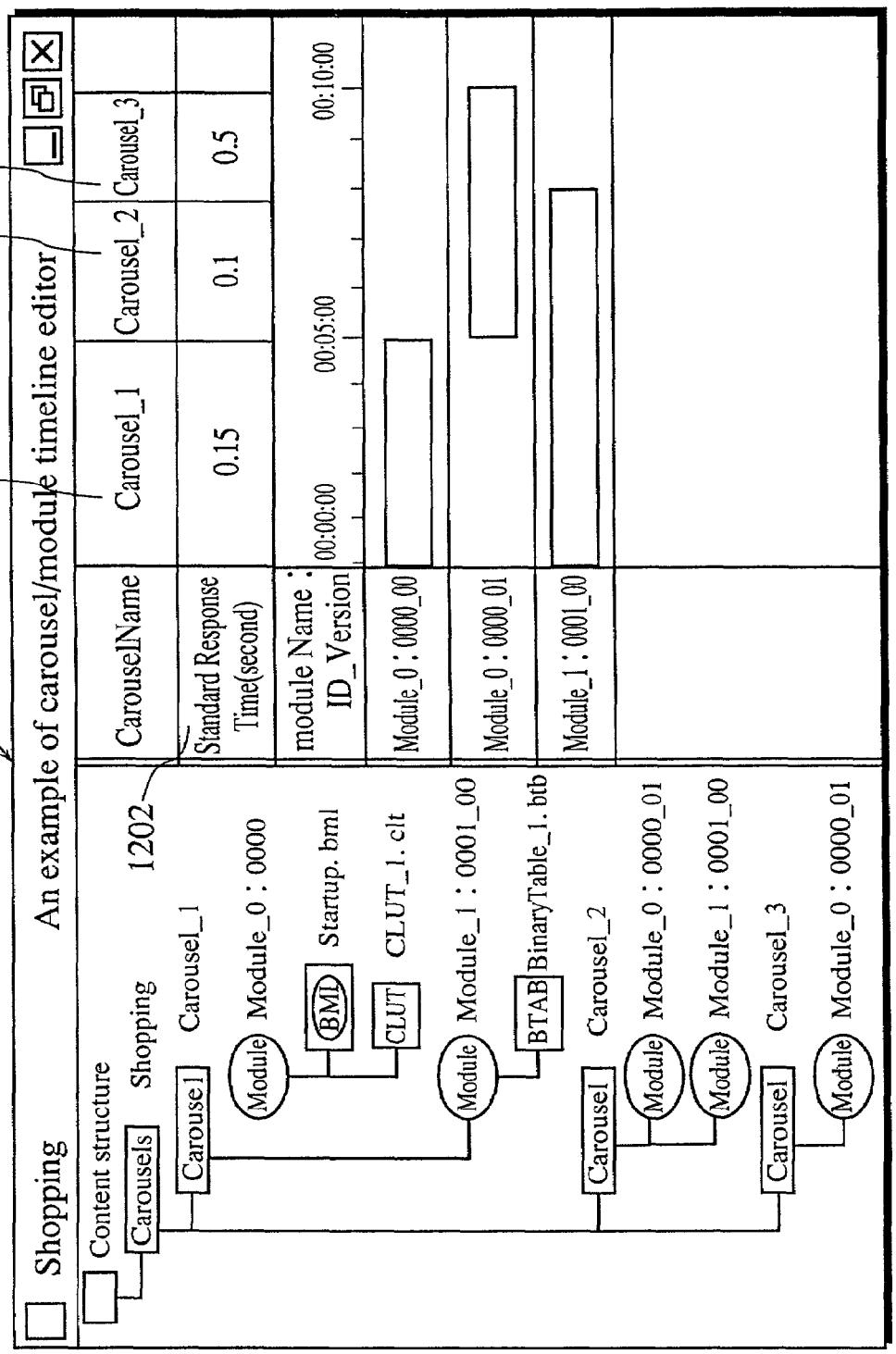
FIG. 12 shows an example of a display screen on which the standard response time is displayed by the display unit in the above embodiment.

FIG. 12 shows the content editing screen on which the standard response times are displayed. On the content editing screen 1201, the standard response time 1202 indicates standard response times respectively for data carousels 902, 903, and 904 are displayed.

When a standard response time is not appropriate, like when the standard response time for the data carousel "Carousel_3" is as long as 10 seconds, the operator may be allowed to change the data transmission bit rate for the data carousel "Carousel_3" via the operation reception unit 102. When the data transmission bit rate is changed, its standard response time is calculated again, and the carousel information 1101 is updated.

Alternatively, to change the standard response time, the displayed standard response time "10 seconds" may be selected and a desired standard response time may be inputted. In this case, a value obtained by dividing the total size of the data carousel by the input standard response time may be displayed on the content editing screen as the data transmission bit rate. In this way, the operator can set an appropriate data transmission bit rate.

Figure 13:
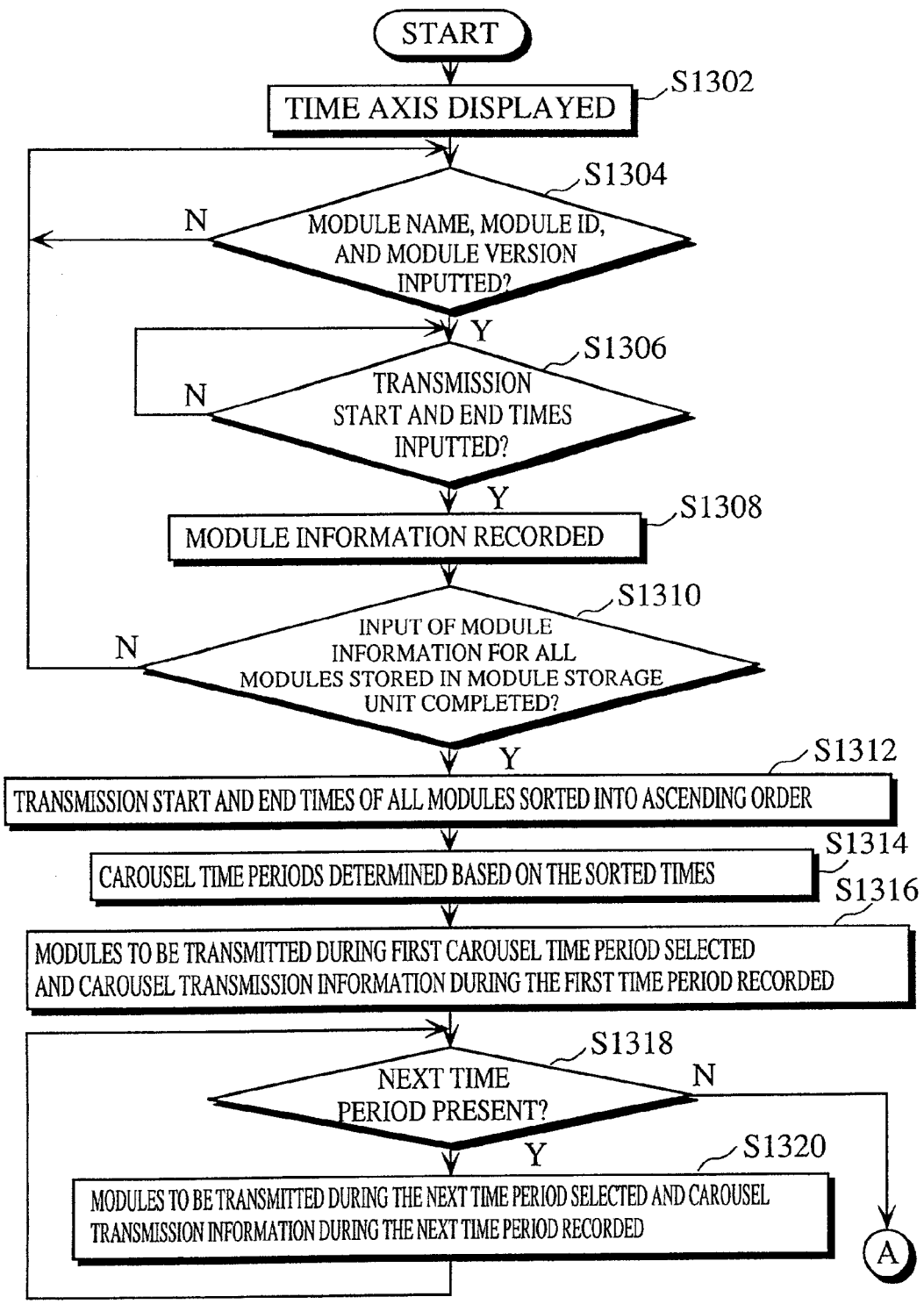
FIG. 13 is flowchart 1 showing the operation of the content editing apparatus in the above embodiment.
Figure 14:
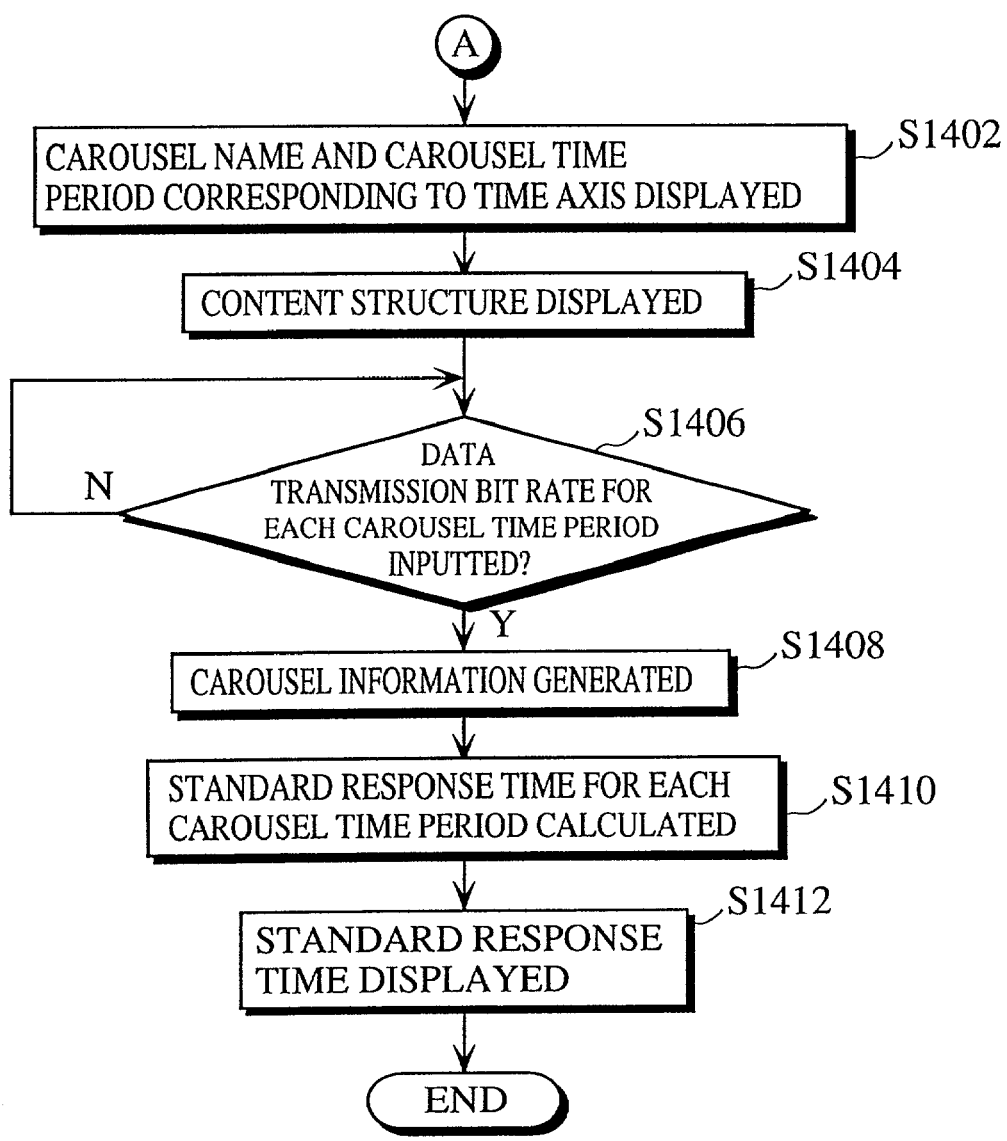
FIG. 14 is flowchart 2 showing the operation of the content editing apparatus in the above embodiment.

The following describes the operation of the present embodiment with reference to flowcharts shown in FIGS. 13 and 14.

First, the operation reception unit 102 receives an indication for editing broadcast content from the operator inputting a content name and a content broadcast time period. The display control unit 104 is notified of the broadcast time period and the like via the control unit 103, and controls the display unit 105 to display an initial screen for content editing. The initial screen displays a time axis having time divisions corresponding to the length of the input content broadcast time period (S1302).

The operation reception unit 102 then waits for input of a module name, a module ID, and a module version from the operator (S1304), and waits for input of a transmission start time and a transmission end time of the module (S1306).

The control unit 103 is notified of the module ID, the module version, and the transmission start time, the transmission end time, and the like inputted via the operation reception unit 12, and stores the received information as module information into the module information storage unit 106 (S1308).

The control unit 103 judges whether input of the module information including a module ID and a transmission start time for all modules stored in the module storage unit 101 is complete or not (S1310). If the judgment result in step S1310 is negative, the processing returns to S1304. If the judgment result in step S1310 is affirmative, the control unit 103 activates the data carousel definition unit 107.

The data carousel definition unit 107 sorts transmission start times and transmission end times for all the modules stored in the module information storage unit 106 into the ascending order (S1312). The data carousel definition unit 107 defines carousel time periods by referring to the sorted times (S1314).

The data carousel definition unit 107 selects modules to be transmitted during the first carousel time period, and stores the carousel transmission information during the first carousel time period (S1316).

The data carousel definition unit 107 judges whether there is a next carousel time period (S1318). When the judgment result in step S1318 is affirmative, the data carousel definition unit 107 selects modules to be transmitted during the next carousel time period, and stores the carousel transmission information during the next carousel time period (S1320).

When the judgment result in step S1318 is negative, the display control unit 104 displays the carousel time period corresponding to the time divisions on the time axis and the carousel name on the content editing screen (S1402).

Following this, the display control unit 104 is notified of identification information and the like for modules included in each data carousel by the control unit 103, and displays the content structure on the content editing screen (S1404).

The operation reception unit 102 waits for input of a data transmission bit rate for each carousel time period (S1406).

The response time calculation unit 108 is notified of the data transmission bit rate for each carousel time period via the control unit 103, and generates carousel information including a total size of each data carousel and the like (S1408), and divides the total size of each data carousel by its data transmission bit rate to obtain a standard response time for each data carousel, and includes the obtained standard response time into the carousel information (S1410).

The display control unit 104 is notified of the standard response time for each data carousel by the control unit 103, and displays the standard response time on the content editing screen (S1412). The processing ends.

It should be noted, although different bar graphs are used to specify transmission times for modules with different version numbers and with the same ID in the above embodiment, one bar graph may be shared by such modules. This is because the transmission times for such modules with different version numbers and the same ID never overlap.

Figure 15:
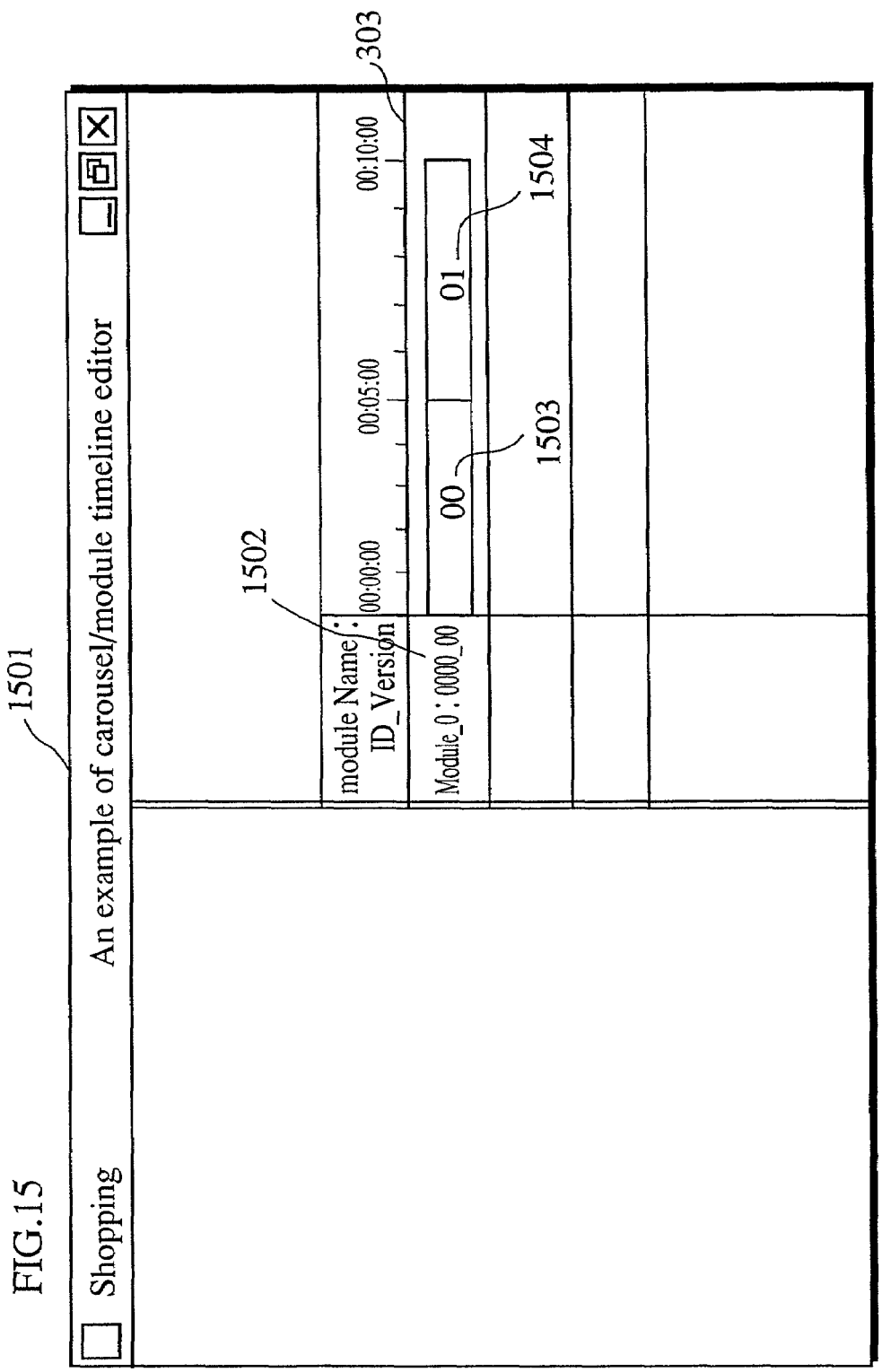
FIG. 15 shows a state where transmission start times and transmission end times of two modules of different versions with a same module ID are displayed using one bar graph, which relates to an application example of the above embodiment.

In this case, for the module name "ID_Version" 1502, a version number "00" is included in the module identification information on the left of the bar graph, and the version number "00" 1503, and a version number "01" 1504 are displayed on the bar graph itself as shown in FIG. 15.

Also, although the above embodiment describes the case where the data transmission start time and the data transmission end time are expressed using relative time to the start time of the broadest content, they may instead be expressed using absolute time.

Although the above embodiment shows the construction as in FIG. 1, the functions of the components shown therein may be realized by a program embodied on a computer. The program may also be recorded on a computer-readable storage medium. The storage medium may be applied to a content editing apparatus that is not provided with the function for defining data carousels, to enable this content editing apparatus to define the data carousels by inputting data transmission start times and data transmission end times of modules.

Furthermore, although the above embodiment describes the content editing apparatus that edits broadcast content, the present invention may also be applied to content-editing for content stored at a site on a network. In this case, although the concept of "data carousel" described in the above embodiment is not present, modules that can be viewed at the site on the network for a certain validity period can be edited. By inputting viewing start times and viewing end times of such modules, the modules that can be viewed during each validity period can be defined. The defined modules are stored at the site on the network during each validity period.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A content editing apparatus that edits digital broadcast content that is composed of a plurality of data carousels for realizing pseudo-interaction, the content editing apparatus comprising:
   reception unit receiving from an operator, modules forming each data carousel, and transmission start times and transmission end times of the modules forming each data carousel;
   module information storage unit storing a list of the transmission start times and the transmission end times of the modules received by the reception unit; and
   data carousel definition unit defining, based on the transmission start times and the transmission end time stored by the module information storage means, a carousel time period of each of the plurality of data carousels, and
   selecting modules to be repeatedly transmitted during the carousel time period, wherein
   the data carousel definition unit includes:
   a time sort unit sorting the transmission start times and the transmission end times into a time order;
   a carousel definition unit defining the carousel time period of each of the plurality of data carousels separated by the sorted transmission start times and the transmission end times;
   a module selection unit for selecting modules to be repeatedly transmitted during the carousel time period; and
   a carousel transmission information storage unit for storing identification information of each module to be transmitted during the carousel time period.

2. The content editing apparatus of claim 1,
   wherein the reception means includes:
   a time axis display unit for displaying a time axis with time divisions;
   a module specification unit for specifying a module, using identification information that is composed of a module ID and a version; and
   a transmission time specification unit for receiving, from the operator, specification of locations on a display displayed by the time axis display unit, so as to specify a transmission start time and a transmission end time of the specified module, the locations each corresponding to a time division on the time axis.

3. The content editing apparatus of claim 2, wherein the reception means further includes a bar graph display unit for displaying a bar graph that is parallel to the time axis, and the transmission time specification unit receives an operation of the operator to specify the transmission start time and the transmission end time, the operation being (a) drag-and-drop of a start of the bar graph to the location corresponding to the transmission start time and (b) drag-and-drop of an end of the bar graph to the location corresponding to the transmission end time, the start of the bar graph and the end of the bar graph at an initial state respectively corresponding to a broadcast start time and a broadcast end time of the digital broadcast content.

4. The content editing apparatus of claim 1, wherein the data carousel definition means further includes a carousel time period display unit for displaying each carousel time period stored by the carousel transmission information storage unit, so as to be in correspondence with the time divisions on the time axis displayed by the time axis display unit.

5. The data processor of claim 1 further comprising:
module storage means for storing modules, identification information for identifying each module, and items of each module, and content structure display control means for displaying a structure of the digital broadcast content in a form that can be viewed by the operator, the structure being a hierarchy including a broadcast content, data carousels, identification information for modules forming each data carousel, identification information for items of each module, in a stated order.

6. The content editing apparatus of claim 1, further comprising:
transmission bit rate reception means for receiving specification of a transmission bit rate of each data carousel from the operator;

module storage means for storing a size of each module; and standard response time calculation means for summing up sizes of the modules selected by the data carousel definition means to be transmitted during the carousel time period, and dividing a resulting value by the transmission bit rate for the data carousel, to obtain a standard response time for the data carousel, the standard response time being a transmission time period of one cycle of the data carousel when each module included therein is transmitted at once sequentially.

7. The content editing apparatus of claim 6, further comprising
standard response time display means for displaying the standard response time for each data carousel calculated by the standard response time calculation means.

8. The content editing apparatus of claim 7, further comprising:
transmission bit rate change means for receiving, from the operator, specification of a transmission bit rate for a data carousel, when the standard response time of the data carousel displayed by the response time display means needs to be changed;

standard response time re-calculation means for re-calculating the standard response time of the data carousel; and standard response time change display means for displaying the standard response time re-calculated by the standard response time re-calculation means instead of the standard response time previously displayed.

9. The content editing apparatus of claim 7, further comprising:
standard response time change operation means for receiving, from the operator, input of a standard response time of the data carousel, when the standard response time of the data carousel displayed by the response time display means needs to be changed;

data transmission bit rate calculation means for dividing a total size of the data carousel by the input standard response time to obtain the transmission bit rate; and data transmission bit rate display means for displaying the calculated transmission bit rate.

10. A content editing method for editing digital broadcast content that is composed of a plurality of data carousels for realizing pseudo-interaction, the content editing method comprising:

a reception step for receiving, from an operator, modules forming each data carousel and transmission start times and transmission end times of the modules forming each data carousel;

module information storage step of storing a list of the transmission start times and the transmission end times of the modules received by the reception unit; and a data carousel definition step for defining, based on the transmission start times and the transmission end times stored in the module information storage step, a carousel time period of each of the plurality of data carousels, and selecting modules to be repeatedly transmitted during the carousel time period, wherein the data carousel definition step includes:

a time sort step of sorting the transmission start times and the transmission end times into a time order;

a carousel definition step of defining the carousel time period of each of the plurality of data carousel separated by the sorted transmission start times and the transmission end times;

a module selection step of selecting modules to be repeatedly transmitted during the carousel time period; and a carousel transmission information storage step of storing identification information of each module to be transmitted during the carousel time period.

11. A computer program for making a computer execute a content editing method for editing digital broadcast content that is composed of a plurality of data carousels for realizing pseudo-interaction, the content editing method comprising:

a reception step for receiving, from an operator, modules forming each data carousel and transmission start times and transmission end times of the modules forming each data carousel;

module information storage step of storing a list of the transmission start times and the transmission end times of the modules received by the reception unit; and a data carousel definition step for defining, based on the transmission start times and the transmission end times stored in the module information storage step, a carousel time period of each of the plurality of data carousels, and selecting modules to be repeatedly transmitted during the carousel time period, wherein the data carousel definition step includes:

a time sort step of sorting the transmission start times and the transmission end times into a time order;

a carousel definition step of defining the carousel time period of each of the plurality of data carousel separated by the sorted transmission start times and the transmission end times;

a module selection step of selecting modules to be repeatedly transmitted during the carousel time period; and a carousel transmission information storage step of storing identification information of each module to be transmitted during the carousel time period.

12. A computer-readable storage medium that can be applied to a content editing apparatus that edits digital broadcast content that is made up of a plurality of data carousels for realizing pseudo-interaction the computer-readable storage medium storing a program comprising:

a reception step for receiving, from an operator, modules forming each data carousel and transmission start times and transmission end times of the modules forming each data carousel;

module information storage step of storing a list of the transmission start times and the transmission end times of the modules received by the reception unit; and a data carousel definition step for defining, based on the transmission start times and the transmission end times stored in the module information storage step, a carousel time period of each of the plurality of data carousels, and selecting modules to be repeatedly transmitted during the carousel time period, wherein the data carousel definition step includes:

a time sort step of sorting the transmission start times and the transmission end times into a time order;

a carousel definition step of defining the carousel time period of each of the plurality of data carousel separated by the sorted transmission start times and the transmission end times;

a module selection step of selecting modules to be repeatedly transmitted during the carousel time period; and a carousel transmission information storage step of storing identification information of each module to be transmitted during the carousel time period.

13. A content editing apparatus that edits content stored at a site on a network in a state of being available for a validity period, comprising:

a reception step for receiving, from an operator, modules forming each data carousel and transmission start times and transmission end times of the modules forming each data carousel;

module information storage step of storing a list of the transmission start times and the transmission end times of the modules received by the reception unit; and a data carousel definition step for defining, based on the transmission start times and the transmission end times stored in the module information storage step, a carousel time period of each of the plurality of data carousels, and selecting modules to be repeatedly transmitted during the carousel time period, wherein the data carousel definition step includes:

a time sort step of sorting the transmission start times and the transmission end times into a time order;

a carousel definition step of defining the carousel time period of each of the plurality of data carousel separated by the sorted transmission start times and the transmission end times;

a module selection step of selecting modules to be repeatedly transmitted during the carousel time period; and a carousel transmission information storage step of storing identification information of each module to be transmitted during the carousel time period.

14. A method for editing broadcast content, comprising:

selecting a plurality of modules and entering corresponding start times and end times;

aggregating the start and end times;

sorting the aggregation into a chronological ordering;

defining a plurality of data carousels having start and end times that correspond with consecutive times in the chronological ordering;

identifying for each of the plurality of data carousels each of the modules from the plurality of modules having start and end times that define a time interval that includes the data carousels start and end time;

displaying a name and the time interval corresponding with each of the plurality of data carousels; and inputting a transmission bit rate for each of the plurality of data carousels.

15. The method of claim 14 further comprising generating carousel information for each of the plurality of data carousels.

16. The method of claim 15 further comprising determining the standard response time for each of the plurality of data carousels.

* * * * *